United States Patent
Verosky et al.

(10) Patent No.: US 11,434,372 B2
(45) Date of Patent: *Sep. 6, 2022

(54) HIGH TEMPERATURE RESISTANT, TWO COMPONENT, LOW VISCOSITY SILICONE COMPOSITION

(71) Applicants: Henkel AG & Co. KGaA, Duesseldorf (DE); Henkel IP & Holding GmbH, Duesseldorf (DE)

(72) Inventors: Christopher Verosky, Coventry, CT (US); Sebastien Lanau, Milan (IT); Giorgio Zaffaroni, Suno (IT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,323

(22) Filed: Jul. 13, 2020

(65) Prior Publication Data

US 2020/0339811 A1 Oct. 29, 2020

Related U.S. Application Data

(63) Continuation-in-part of application No. 15/862,939, filed on Jan. 5, 2018, now Pat. No. 10,711,135, and a continuation of application No. PCT/US2016/036127, filed on Jun. 7, 2016.

(60) Provisional application No. 62/189,251, filed on Jul. 7, 2015.

(51) Int. Cl.
| | |
|---|---|
| *C08K 3/36* | (2006.01) |
| *C08L 83/06* | (2006.01) |
| *C09K 3/10* | (2006.01) |
| *F16J 15/14* | (2006.01) |

(52) U.S. Cl.
CPC .............. *C08L 83/06* (2013.01); *C08K 3/36* (2013.01); *C09K 3/1018* (2013.01); *F16J 15/14* (2013.01); *C08L 2205/06* (2013.01); *C09K 2200/0685* (2013.01)

(58) Field of Classification Search
CPC ............ C08L 83/04; C08L 83/06; C08K 3/36
See application file for complete search history.

(56) References Cited

U.S. PATENT DOCUMENTS

| | | | |
|---|---|---|---|
| 3,189,576 A | 6/1965 | Sweet | |
| 4,647,618 A | 3/1987 | Bauman et al. | |
| 4,929,669 A | 5/1990 | Jensen | |
| 5,126,171 A | 6/1992 | Katsuno et al. | |
| 5,346,940 A * | 9/1994 | Brassard | C08L 83/04 |
| | | | 524/267 |
| 6,593,413 B2 | 7/2003 | Muramatsu et al. | |
| 7,534,840 B2 * | 5/2009 | Futatsumori | C08L 83/04 |
| | | | 428/405 |
| 7,998,588 B2 | 8/2011 | Sakamoto et al. | |
| 8,801,890 B2 | 8/2014 | Verosky et al. | |
| 2009/0068475 A1 | 3/2009 | Bosshammer | |
| 2011/0166280 A1 | 7/2011 | Davio et al. | |
| 2012/0065308 A1 * | 3/2012 | Sumi | C08L 83/04 |
| | | | 524/139 |
| 2013/0245172 A1 * | 9/2013 | Buttner | C08L 79/02 |
| | | | 524/243 |
| 2014/0238471 A1 | 8/2014 | Wakita et al. | |
| 2015/0210909 A1 * | 7/2015 | Von Malotki | C08L 83/04 |
| | | | 428/447 |
| 2015/0267094 A1 | 9/2015 | Friedel | |
| 2016/0130404 A1 * | 5/2016 | Patel | C08K 5/5419 |
| | | | 528/35 |
| 2017/0321039 A1 * | 11/2017 | Kuhn | C09D 183/04 |

FOREIGN PATENT DOCUMENTS

| | | |
|---|---|---|
| JP | H0350287 A | 3/1991 |
| JP | 2002012767 A | 1/2002 |
| JP | 2008150491 A | 7/2008 |
| JP | 2011507996 A | 3/2011 |
| JP | 2012533678 A | 12/2012 |
| JP | 2013139510 A | 7/2013 |
| RU | 2105778 C1 | 2/1998 |
| WO | 2014/023609 * | 2/2014 |
| WO | 2014086638 A1 | 6/2014 |

OTHER PUBLICATIONS

International Search Report for International PCT Patent Application No. PCT/US2016/036127 dated Sep. 15, 2016.
European Search Report for EP Patent Application No. 16821784.2 dated Jan. 21, 2019.

* cited by examiner

*Primary Examiner* — Margaret G Moore
(74) *Attorney, Agent, or Firm* — James E. Piotrowski

(57) ABSTRACT

A two part curable composition comprising organosiloxane polymer; water; an organosilane such as hexamethyldisilazane (HMDS) or vinyltrimethoxysilane; crosslinker; adhesion promoter and catalyst; and optionally comprising plasticizer; colorant and filler. The first part can comprise organosiloxane polymer and water. The second part can comprise crosslinker; adhesion promoter and catalyst. Either or both parts can optionally further comprise an organosilane such as hexamethyldisilazane (HMDS) or vinyltrimethoxysilane; plasticizer; colorant and filler. Cured reaction products of the two part curable organosiloxane composition has good adhesion to metallic sealing surfaces and good resistance engine oil and other automotive fluids. Cured reaction products of the two part curable organosiloxane composition can surprisingly retain physical properties after long-term exposure to temperatures between 200° C. and 250° C. and can retain physical properties after exposure to temperatures between 250° C. to 300° C. for short periods.

14 Claims, No Drawings

HIGH TEMPERATURE RESISTANT, TWO COMPONENT, LOW VISCOSITY SILICONE COMPOSITION

FIELD

The present disclosure relates generally to a two component, curable organosiloxane composition having low viscosity and high temperature resistance.

BRIEF DESCRIPTION OF RELATED TECHNOLOGY

Small internal combustion engines for use in lawn mowers, leaf blowers, generators, etc. are ubiquitous. These engines typically have a block surrounding and supporting most of the moving engine parts. Other engine parts such as a cylinder, head, cover, intake manifold, exhaust manifold, etc. are attached to the block or each other. A Transmission or other unit can be attached to the engine to provide a powertrain for some applications. Most small internal combustion engines rely on air for cooling rather than fluid. These air cooled engines can run at higher temperatures than liquid cooled engines and the components on air cooled engines can see higher service temperatures than in liquid cooled engines.

Many of the engine, transmission and other powertrain parts having sealing surfaces that are adjacent other sealing surfaces when the parts are assembled. A gasket can be disposed between the sealing surfaces to form a seal there between.

The conventional technology used for gaskets is pre-cut metal and/or fiber gaskets. These conventional gaskets have a number of limitations. All cut gaskets will experience compression set in service. If the compression set becomes too great, the sealing force will be lost and the gasket will leak. Proper performance of a cut gasket relies heavily on correct placement and correct clamp load. This requires a skilled assembler. The unit cost of a cut gasket is usually high. Further, each uniquely shaped sealing surface requires its own unique shaped cut gasket. This requires a manufacturer to maintain a parts inventory of many cut gaskets for each powertrain component, increasing cost.

Replacement of cut gaskets by curable liquid sealants has been tried. These replacement attempts have not always been commercially successful, especially when used in high temperature applications. Selected organosilicone compositions are the only practical sealant chemistry that will survive high engine and powertrain service temperatures without degradation. Some liquid, single component, curable organosiloxane compositions (sometimes referred to as single component RTV cure sealant) require moisture from the environment to cure. Once the sealing surfaces are assembled with sealant there between there may be insufficient moisture for curing. Applying the liquid single component, curable organosiloxane composition to a powertrain component sealing surface and allowing it to cure before assembling the part to the mating sealing surface is not desirable as it adds excessive time and parts inventory to the assembly process. Further, the cured sealant has the same compression set limitations of the aforementioned cut gaskets.

Some liquid, single component, curable organosiloxane compositions can be cured by heat. A heat cured organosiloxane compositions is not desirable as it requires the manufacturer to purchase, run and maintain ovens and requires an inventory of parts running through the ovens.

A dual component, acetoxy cure organosiloxane composition can be applied in the mixed state, however adhesion to the metallic sealing surfaces is typically less than desired for the application. Further, acetoxy cure organosiloxane compositions form acetic acid on curing. The acetic acid may corrode metals used in the powertrain component.

Curable organosiloxane compositions may be extremely viscous and difficult to apply to a sealing surface. Some curable organosiloxane compositions do not have the desired resistance to oils and fuels used in engines and transmissions.

Thus, there is a need for new curable compositions that can be applied to a powertrain component sealing surface and cured to form a gasket that will retain physical properties after exposure to high service temperatures.

SUMMARY

One embodiment of this disclosure describes a two part curable composition comprising organosiloxane polymer; water; crosslinker; catalyst. The curable composition can optionally comprise an organosilane such as hexamethyldisilazane (HMDS) or vinyltrimethoxysilane; adhesion promoter, plasticizer; colorant, filler and/or additives.

One embodiment of this disclosure describes a two part curable composition comprising organosiloxane polymer; water; an organosilane such as hexamethyldisilazane (HMDS) or vinyltrimethoxysilane; filler; crosslinker; adhesion promoter and catalyst. The curable composition can optionally comprise plasticizer; colorant, filler and/or additives.

One embodiment of this disclosure describes a two part curable composition. The first part typically comprises organosiloxane polymer and water. The second part typically comprises crosslinker; adhesion promoter and catalyst. Either or both parts can optionally further comprise an organosilane such as hexamethyldisilazane (HMDS) or vinyltrimethoxysilane, plasticizer, colorant, filler and/or additives.

Cured reaction products of the disclosed two part curable organosiloxane composition have good adhesion to metallic sealing surfaces and good resistance engine oil and other automotive fluids. These cured reaction products can surprisingly retain physical properties after long-term exposure to temperatures between 200° C. and 250° C. and can retain physical properties after exposure to temperatures between 250° C. to 300° C. for short periods (about 100 hours). In some variations the two part curable composition desirably does not emit reaction products that are corrosive to ferrous metallic substrates.

The mixed two part curable organosiloxane composition can have a surprisingly low viscosity and high extrusion rates to allow the mixed composition to be injected into a small cavity.

One embodiment of this disclosure describes the cured reaction products of a two part curable composition comprising organosiloxane polymer; water; an organosilane such as hexamethyldisilazane (HMDS) or vinyltrimethoxysilane; crosslinker; adhesion promoter; catalyst and optionally comprising plasticizer; colorant, filler and/or additives.

One embodiment of this disclosure describes a gasket disposed between sealing surfaces of internal combustion engine or other powertrain component parts wherein the gasket comprises cured reaction products of the above described two part curable composition.

The disclosed compounds include any and all isomers and steroisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

As used herein for each of the various embodiments, the following definitions apply:

Unless otherwise specifically defined, "aliphatic" means saturated or unsaturated, straight, branched or cyclic hydrocarbon groups.

Unless otherwise specifically defined, "alkoxy" refers to the general formula —O— alkyl.

Unless otherwise specifically defined, "alkyl" refers to a linear, branched or cyclic saturated organic group having from 1 to about 9 carbon atoms including, for example, methyl, ethyl, propyl, butyl, hexyl, octyl, isopropyl, isobutyl, tert-butyl, cyclopropyl, cyclohexyl, cyclooctyl, vinyl and allyl. Unless otherwise specifically defined, an alkyl group can be substituted or unsubstituted. Unless otherwise specifically limited, a cyclic alkyl group includes monocyclic, bicyclic and polycyclic rings, for example norbornyl, adamantyl and related terpenes.

Unless otherwise specifically defined, an aromatic ring is an unsaturated ring structure having about 5 to about 6 ring members and including only carbon as ring atoms. Unless otherwise specifically defined, an aromatic ring can be substituted or unsubstituted.

Unless otherwise specifically defined, "aromatic" or "aryl" refers to cyclic conjugated hydrocarbon structures ($C_{1-12}$) that include only carbon as ring atoms and which may optionally be substituted or unsubstituted, for example phenyl, biphenyl or naphthyl.

Unless otherwise specifically defined, "hal", "halo" and "halogen" refer to an atom selected from fluorine, chlorine, bromine and iodine.

Unless otherwise specifically defined, the term "oligomer" means a defined, small number of repeating monomer units such as 10-25,000 units, and desirably 10-100 units which have been polymerized to form a molecule, and is a subset of the term polymer.

Unless otherwise specifically defined, the term "polymer" refers to any polymerized product greater in chain length and molecular weight than an oligomer, i.e. a degree of polymerization greater than 25,000.

Unless otherwise specifically defined, room temperature is about 23-25° C. and room humidity is about 50% relative humidity.

Unless otherwise specifically limited the term substituted means substituted by at least one below described substituent group in any possible position or positions. Substituent groups for the above moieties useful in the disclosed compounds are those groups that do not significantly diminish the activity of the disclosed compound, for example, H, halogen, $N_3$, NCS, CN, $NO_2$, $NX_1X_2$, $OX_3$, $C(X_4)_3$, OAc, O-acyl, O-aroyl, NH-acyl, NH-aroyl, NHCOalkyl, CHO, C(halogen)$_3$, COOX$_4$, SO$_3$H, PO$_3$H$_2$, SO$_2$NX$_1$X$_2$, CONX$_1$X$_2$, C(O)CF$_3$, alkyl, alcohol, alkoxy, alkylmercapto, alkylamino, di-alkylamino, aryl, alkaryl, sulfonamide or thioalkoxy wherein $X_1$ and $X_2$ each independently comprise H or alkyl, or $X_1$ and $X_2$ together comprise part of a heterocyclic ring having about 4 to about 7 ring members and optionally one additional heteroatom selected from O, N or S, or $X_1$ and $X_2$ together comprise part of an imide ring having about 5 to about 6 members and $X_4$ comprises H, alkyl, loweralkylhydroxy, or alkyl-NX$_1$X$_2$. Unless otherwise specifically limited, a substituent group may be in any possible position or any possible positions if multiply substituted.

Unless otherwise specifically defined, the term "two part composition" or "2K composition" means a composition having two parts (A and B) each of which are intended to be stored separately until use and which react when combined together.

The disclosed curable organosiloxane composition is a two component composition. A two component composition has two components each of which is separately stable, but which upon mixing begin to cure and gel in about 5 minutes and fully cure in 24 to 168 hours at room temperature and humidity to produce a reaction product having desired properties.

The disclosed curable organosiloxane composition comprises organosiloxane polymer; water; crosslinker; catalyst. The curable composition can optionally comprise one or more of an organosilane such as hexamethyldisilazane (HMDS) or vinyltrimethoxysilane; adhesion promoter, plasticizer; colorant, filler and/or additives in either part.

The organosiloxane polymer can be any hydroxyl terminated polydimethyl siloxane (PDMS) such as a liquid hydroxy terminated compound of the formula

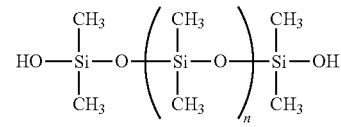

where n is an integer of 2 or more. Suitable hydroxyl terminated polydimethyl siloxane compounds have a viscosity at 25° C. of about 100 cP to about 100,000 cP, preferably about 750 cP to about 20,000 cP. Some useful organosilicone polymers are sold under the Masil® name by Emerald Performance Materials.

The plasticizer is an organosiloxane material that does not react with the other components of the composition but in which the other components can be carried. Useful plasticizers include inert silicone fluids such as polydimethylsiloxane. Desirably the plasticizer has a viscosity in the range of about 50-100,000 cP. Useful polydimethylsiloxane plasticizers are sold by Xiameter and Dow Corning Corporation.

The filler is typically in the physical form of a fiber, flake or powder. Typical filler size is about 1 to about 30 microns d50 particle size distribution. Some useful fillers include, for example, lithopone; zirconium silicate; Cristobalite; Cristobalite that has been surface treated such as with silane, epoxysilane, methacrylsilane, trimethylsilane, methylsilane or silazane; quartz; hydroxides such as calcium, aluminum, magnesium and iron hydroxide; diatomaceous earth; carbonates such as sodium, potassium, calcium, and magnesium carbonates; ceramic oxides and metal oxides such as iron, zinc, magnesium, chromic, cerium, zirconium and aluminum oxides; clay; fumed silica; precipitated silica; silica that has been surface treated with a silane or silazane such as the AEROSIL products available from Evonik Industries; silica that has been surface treated with an acrylate or methacrylate such as AEROSIL R7200 or R711 available from Evonik Industries; graphite; metal powder such as copper powder; synthetic fibers; and mixtures thereof. When used filler can be employed in concentrations effective to provide desired physical properties in the uncured composition and cured reaction products. A combination of fumed silica, precipitated silica, carbon black, copper powder and Cristobalite is preferred as compositions using this mixture retain their physical properties surprisingly well after exposure to high temperatures over long periods of time. Fillers such as calcium carbonate and ATH are not desirable as compositions using these fillers may not retain properties after exposure to high temperatures.

The water can help to promote curing through thick sections of the mixed composition. The water may be present as a liquid or in the form of a moisture containing filler or both. Advantageously, the water is included in the form of a moisture-containing filler. One useful water-containing filler is precipitated silica.

The crosslinker in the disclosed composition can be any compound that will react with the organosiloxane polymer to provide the desired property retention after high temperature exposure. Known crosslinkers for use with organosiloxane polymers include acetoxy compounds, oxime compounds, alkoxy compounds, benzamide compounds, amine compounds and aminoxy compounds. Some exemplary oxime containing organosiloxanes include those containing 2-butanone oxime, i.e. methyl ethyl ketoxime (MEKO) groups such as described in U.S. Pat. No. 3,189,576; organosiloxanes which contain both 2-butanone groups and alkoxy groups; organosiloxanes containing acetone oxime i.e. propanone oxime groups; organosiloxanes containing methyl isobutylketoxime groups; organosiloxanes containing bis-, tris-, or tetrakis-methyl isopropyl ketoxime (MIPKO) or methyl propyl ketoxime (MPKO) groups and acetonoximo. Some exemplary acetoxy compounds are acetoxy silanes such as methyltriacetoxysilane and ethyltriacetoxysilane.

Advantageously, the crosslinker is one or more alkoxy containing organosiloxane compounds and/or one or more oxime containing organosiloxane compounds. Preferable the crosslinker is an oxime containing organosiloxane compound. Curable compositions using oxime crosslinkers do not emit corrosive byproducts and have desirable temperature resistance, oil and fluid resistance and high adhesion.

The adhesion promoter is a compound that helps promote adhesion of the cured composition to a surface. Useful adhesion promoters include organofunctional silanes including, for example, aminosilane compounds, (meth)acryl silane compounds and epoxy glycidyl silane compounds. Exemplary aminosilane compounds include, but are not limited to, silane compounds containing amino-alkyl groups, such as gamma-ureidopropyltrimethoxy silane, 3-aminopropyl trimethoxysilane, N,N'-bis(3-trimethoxysilylpropyl)urea, gamma-aminopropyltrimethoxysilane, N-(2-aminoethyl)-3-aminopropyltriethoxysilane, N-(2-aminoethyl)-3-aminopropyltrimethoxysilane, timethoxysilylpropyldiethylene triamine, tertiary alkyl carbamate silane, and aminoethyl-3-aminopropyl-methyl-dimethylsilane. Some examples of commercially available adhesion promoters include octyl alkoxysilanes such as A-137 available from Witco Corporation; vinyl trimethoxysilane; tetraethoxysilane and its partial condensation products; glycidyl silanes such as 3,4 epoxycyclohexylethyltrimethoxysilane (A-186) and glycidiopropyltrimethoxysilane (A-187) both available from Witco Corporation and glycidiopropyltriethoxysilane (GLYEO) available from Evonik; and methacryl silanes such as A-174 available from Witco Corporation.

The catalyst promotes reaction of the mixed parts. Some exemplary catalysts include an organometallic compound including metals such as titanium, tin, or zirconium. Illustrative examples of the organotitanium compounds include tetraisopropoxy titanate and tetrabutoxy titanate. Illustrative examples of the organotin compounds include dibutyltin dilaurate, dibutyltin diacetate, dibutyltin dioctoate, dimethyltin carboxylate and dioctyltin carboxylate. Illustrative examples of the organozirconium compounds includes zirconium octanoate. Effective amounts of organometallic catalysts are those that will facilitate cure of the mixed composition.

The disclosed composition can optionally include one or more additives so long as they do not inhibit the curing mechanism or intended use. Exemplary additives include one or more of plasticizer, colorant, filler, antioxidant, heat stabilizer, moisture scavenger, inhibitor, odor mask, and the like.

The colorant can be a pigment or dye to provide a desired color beneficial to the intended application. Exemplary colorants include titanium dioxide, carbon black, C.I. Pigment Blue 28, C.I. Pigment Yellow 53 and phthalocyanine blue BN. In some applications the colorant can be, or include, a fluorescent dye to allow inspection of the applied composition under UV radiation. The coloring agent will be present in amounts sufficient to allow for desired coloration or detection.

The two component organosiloxane composition comprises a Part A and a Part B that are stored separately until just before use. Mixing the two parts initiates a reaction, with the mixture gelling in about 5 minutes and fully curing in 24 to 168 hours at room temperature to produce a reaction product. Part A typically comprises organosiloxane polymer and water. Part A can also include filler if the water is in the form of a water containing filler. Part A can optionally contain an organosilane such as hexamethyldisilazane (HMDS) or vinyltrimethoxysilane; plasticizer; one or more additional fillers; and one or more additives.

Part B typically comprises an organosilane such as hexamethyldisilazane (HMDS) or vinyltrimethoxysilane; crosslinker; adhesion promoter and catalyst. Part B can optionally comprise plasticizer; one or more fillers; and one or more additives.

Each of the two-parts (A and B) remain shelf stable for until such time as they are combined together and permitted to react. The components can be mixed at A:B ratios of 10:1 to 2:1 and typically at 4:1.

The disclosed curable compositions when mixed can have a viscosity below 600,000 cP. In some applications the disclosed curable compositions when mixed can have a viscosity below 500,000 cP. In some applications the disclosed curable compositions when mixed can have a viscosity in the range of about 200,000 cP to about 500,000 cP. In some applications the disclosed curable compositions when mixed can have a viscosity in the range of about 30,000 cP to about 100,000 cP and typically, for those applications, have a viscosity in the range of about 40,000 cP to about 50,000 cP. Viscosity can be measured at 10 s-1 with 25 mm/2 deg cone, using Physica model MCR 301 rheometer.

Viscosities above about 200,000 and up to about 600,000 allow the mixed composition to be used in surface bead applications. This type of application can be used in appliance and automotive assemblies. Viscosities below about 200,000 cP allow the mixed composition to be injected into small cavities at high extrusion rates. The disclosed curable compositions when mixed can have an extrusion rate greater than 100 grams/minute (g/min). The disclosed curable compositions when mixed can advantageously have an extrusion rate in the range of about 100 to about 200 g/min. The disclosed curable compositions when mixed can typically have an extrusion rate in the range of about 150 to about 200 g/min. This is surprisingly higher than extrusion rates of about 50 grams/minute seen for other high temperature resistant compositions. Extrusion rate can found by measuring the amount of composition per minute extruded at 6 bar through a Quadro MFQX 10.7-24 static mixer from Sulzer Mixpac USA.

The disclosed curable compositions when mixed can be used in a variety of application areas where the cured composition must retain a mix of properties, such as tensile strength and elongation and hardness and lap shear strength after exposure to temperatures of 250° C. for long periods, such as up to 42 days or more, and exposures to 300° C. for short periods, such as up to 3 days or more, are desired. In some desirable embodiments cured reaction products of the mixed curable compositions can retain 70% to 120% of their cured tensile strength and elongation and hardness and lap shear strength properties after exposure to temperatures of 250° C. for up to 42 days. In some desirable embodiments cured reaction products of the mixed curable compositions can retain 80% to 110% of their cured tensile strength and elongation and hardness and lap shear strength properties after exposure to temperatures of 250° C. for up to 42 days. In some desirable embodiments cured reaction products of the mixed curable compositions can retain 50% to 130% of their cured tensile strength and elongation and hardness and lap shear strength properties after exposure to temperatures of 300° C. for periods of up to 3 days.

Some exemplary compositions for part A are provided below. The wt. % of all components in Part A will equal 100 wt. %.

| part A component | wt. % | preferred wt. % |
|---|---|---|
| organosiloxane polymer | 20 to 90 | 45 to 75 |
| plasticizer | 0 to 15 | 0 to 5 |
| filler | 0-85 | 20-60 |
| organosilane such as hexamethyldisilazane (HMDS) or vinyltrimethoxysilane; | 0-1 | 0.1-0.3 |
| water | 0.1-1 | 0.1-0.5 |
| additives | 0-30 | 1-10 |

Some exemplary compositions for part B are provided below. The wt. % of all components in Part B will equal 100 wt. %.

| part B component | wt. % | preferred wt. % |
|---|---|---|
| plasticizer | 10-80 | 20-60 |
| filler | 0-85 | 20-65 |
| organosilane such as hexamethyldisilazane (HMDS) or vinyltrimethoxysilane; | 0.1-12 | 0.3-0.7 |
| crosslinker | 0.1-15 | 5-10 |
| adhesion promoter | 0.1-10 | 2-4 |
| catalyst | 0.1-2 | 0.5-1 |
| additives | 0-30 | 1-10 |

The following examples are included for purposes of illustration so that the disclosure may be more readily understood and are in no way intended to limit the scope of the disclosure unless otherwise specifically indicated.

The following tests were used in the Examples.
Tensile strength was tested according to ISO 37.
Elongation was tested according to ISO 37.
Shore hardness was tested according to ASTM D2240.
Lap shear strength was tested according to ASTM D1002.
Extrusion rate was measured by extruding the test composition at 6 bar through a Quadro MFQX 10.7-24 static mixer from Sulzer Mixpac USA.
Viscosity was measured at 10 s-1 with 25 mm/2 deg cone, using Physica model MCR 301 rheometer.

The following materials were used in the Examples.
AMMO is an aminosilane adhesion promoter available from Evonik Industries AG, Germany.
Aerosil R8200 is a surface treated fumed silica available from Evonik Industries AG, Germany.
Black iron oxide $Fe_3O_4$, 99.5% purity, <45 microns.
Copper powder, >99% purity, <45 microns.
LM400 is an oxime crosslinker available from Rheinmetall Nitrochemie, Germany.
Fumed silica is available as Aerosil from Evonik Industries AG, Germany.
Hexamethyldisilazane.
Hydroxy terminated PDMS, 6,000 cP.
Plasticizer is methyl terminated PDMS, 1,000 cP.
Carbon black filler, 23 micron average particle size, 150 $M^2$/gram surface area.
Quartz filler, 96.3% purity, <5 microns.
Silbond 8000TST is a surface treated Cristobalite powder available from Qwarzwerke Gruppe, Germany.
Surface treated fumed silica is available as Aerosil from Evonik Industries AG, Germany.
UL 38 is a dioctyltin carboxylate based catalyst available from Momentive Performance Materials, Inc.
Zeothix 95 is a precipitated silica available from J. M. Huber Corporation.

EXAMPLE 1

Preparation of 1-A

| Component | wt. % |
|---|---|
| organosiloxane polymer[1] | 68 |
| Cristobalite powder, surface treated[2] | 23.5 |
| carbon black filler | 3 |
| precipitated silica[3] | 3 |
| copper powder | 2.3 |
| Hexamethyldisilazane | 0.2 |

[1]hydroxy terminated PDMS.
[2]Silbond 8000TST.
[3]Zeothix 95.

Example 1-A was made as follows. Add Cristobalite powder, colorant, hexamethyldisilazane and most of the organosiloxane polymer to a mixer. Mix these ingredients at high speed and heat to 100° C. for 30 min. While heating vacuum strip for 30 min. Cool to room temperature. Add the remaining ingredients and mix for 30 minutes with vacuum while keeping the batch temperature below 50° C. The final Part A composition had a viscosity of about 40,000-50,000 cP.

Preparation of 1-B

| Component | wt. % |
| --- | --- |
| plasticizer[1] | 44.8 |
| fumed silica, treated[2] | 10.2 |
| Cristobalite powder, surface treated[3] | 32.5 |
| oxime crosslinker[4] | 8.5 |
| adhesion promoter[5] | 2.9 |
| catalyst[6] | 0.6 |
| hexamethyldisilazane | 0.5 |

[1]methyl terminated PDMS.
[2]Aerosil R8200.
[3]Silbond 8000TST.
[4]LM400
[5]AMMO
[6]UL 38.

Example 1-B was made as follows. Add plasticizer, Cristobalite powder, and fumed silica to a mixer. Mix at high speed and heat to 100° C. for 30 min with vacuum. Cool to room temperature. Add oxime crosslinker and mix for 5 minutes with vacuum. Add adhesion promoter and mix for 5 minutes with vacuum. Add catalyst and mix 5 minutes with vacuum. Add hexamethyldisilazane and mix 5 minutes with vacuum. The final Part B composition had a viscosity of about 40,000-50,000 cP.

The two parts are mixed at a ratio of 4:1 by volume (i.e. 4 parts 1-A:1 part 1-B). The uncured mixture had a viscosity of 40,000 to 50,000 cP. The uncured mixture had an extrusion rate of 190 grams/minute. After 1 week at 25° C./50% R.H. the cured properties of the resulting reaction products are:

| | |
| --- | --- |
| Tensile strength | 270 psi |
| Elongation | 200% |
| Shore A hardness | 27 |
| Lap Shear strength to Alclad aluminum[1] | 205 psi |

[1]AD-14 strips from Q-panel.

The two parts are mixed at a ratio of 4:1 by volume (i.e. 4 parts 1-A:1 part 1-B). After 1 week at 25° C./50% R.N. followed by 6 weeks at 250° C. the cured properties of the resulting reaction products are:

| | |
| --- | --- |
| Tensile strength | 270 psi |
| Elongation | 180% |
| Shore A hardness | 30 |
| Lap Shear strength to Alclad aluminum[1] | 165 psi |

[1]AD-14 strips from Q-panel.

The two parts are mixed at a ratio of 4:1 by volume (i.e. 4 parts 1-A:1 part 1-B). After 1 week at 25° C./50% R.N. followed by 3 Days at 300° C. the cured properties of the resulting reaction products are:

| | |
| --- | --- |
| Tensile strength | 235 psi |
| Elongation | 240% |
| Shore A hardness | 21 |
| Lap Shear strength to Alclad aluminum[1] | 105 psi |

[1]AD-14 strips from Q-panel.

EXAMPLE 2

Preparation of 2-A

| Component | wt. % |
| --- | --- |
| organosiloxane polymer[1] | 77.4 |
| fumed silica, surface treated[2] | 15 |
| carbon black filler | 2.5 |
| precipitated silica[3] | 3.6 |
| black iron oxide | 1.5 |

[1]hydroxy terminated PDMS.
[2]Aerosil R8200.
[3]Zeothix 95.

Example 2-A was made as follows. Add fumed silica, iron oxide powder, colorant, hexamethyldisilazane and most of the organosiloxane polymer to a mixer. Mix these ingredients at high speed and heat to 100° C. for 30 min. While heating vacuum strip for 30 min. Cool to room temperature. Add the remaining ingredients and mix for 30 minutes with vacuum while keeping the batch temperature below 50° C. The final Part A composition had a viscosity of about 45,000-55,000 cP.

Preparation of 2-B

| Component | wt. % |
| --- | --- |
| plasticizer[1] | 44.8 |
| fumed silica, treated[2] | 10.2 |
| quartz filler | 32.5 |
| oxime crosslinker[3] | 8.5 |
| adhesion promoter[4] | 2.9 |
| catalyst[5] | 0.6 |
| hexamethyldisilazane | 0.5 |

[1]methyl terminated PDMS.
[2]Aerosil R8200.
[3]LM400
[4]AMMO.
[5]UL 38.

Example 2-B was made as follows. Add plasticizer, quartz filler, and fumed silica to a mixer. Mix at high speed and heat to 100° C. for 30 min with vacuum. Cool to room temperature. Add oxime crosslinker and mix for 5 minutes with vacuum. Add adhesion promoter and mix for 5 minutes with vacuum. Add catalyst and mix 5 minutes with vacuum. Add hexamethyldisilazane and mix 5 minutes with vacuum. The final Part B composition had a viscosity of about 45,000-55,000 cP.

The two parts are mixed at a ratio of 4:1 by volume (i.e. 4 parts 2-A:1 part 2-B). The uncured mixture had a viscosity of 45,000-55,000 cP. The uncured mixture had an extrusion rate of 190 grams/minute. After 1 week at 25° C./50% R.H. the cured properties of the resulting reaction products are:

| Tensile strength | 385 psi |
|---|---|
| Elongation | 285% |
| Shore A hardness | 33 |
| Lap Shear strength to Alclad aluminum[1] | 105 psi with cohesive failure |

[1] AD-14 strips from Q-panel.

The two parts are mixed at a ratio of 4:1 by volume (i.e. 4 parts 2-A:1 part 2-B). After 1 week at 25° C./50% R.N. followed by 6 weeks at 250° C. the cured properties of the resulting reaction products are:

| Tensile strength | 344 psi |
|---|---|
| Elongation | 100% |
| Shore A hardness | 55 |
| Lap Shear strength to Alclad aluminum[1] | 300 psi with cohesive failure |

[1] AD-14 strips from Q-panel.

The two parts are mixed at a ratio of 4:1 by volume (i.e. 4 parts 2-A:1 part 2-B). After 1 week at 25° C./50% R.H. followed by 3 days at 300° C. the cured properties of the resulting reaction products are:

| Tensile strength | — psi |
|---|---|
| Elongation | — % |
| Shore A hardness | 67 |
| Lap Shear strength to Alclad aluminum[1] | — psi |

[1] AD-14 strips from Q-panel.
— = not tested

As shown in the following Table, cured reaction products of the disclosed compositions retain their mix of properties better than some other commercial products after exposure to temperatures of 250° C. for 42 days.

| Property | Example 1 | Example 2 | D[4] | A[1] | B[2] | C[3] |
|---|---|---|---|---|---|---|
| tensile strength - psi | | | | | | |
| 7 days at 25° C. and 50% RH | 270 | 385 | 549 | 200 | 220 | 305 |
| 7 days at 25° C. and 50% RH and 42 days at 250° C. | 270 | 344 | 583 | 135 | | 125 |
| % retained | 100 | 89 | 106 | 68 | — | 41 |
| elongation - % | | | | | | |
| 7 days at 25° C. and 50% RH | 200 | 285 | 178 | 350 | 450 | 135 |
| 7 days at 25° C. and 50% RH and 42 days at 250° C. | 180 | 100 | 143 | 370 | | 1 |
| % Retained | 90 | 35 | 80 | 106 | — | 0.7 |
| hardness - Shore A | | | | | | |
| 7 days at 25° C. and 50% RH | 27 | 33 | 44 | 17 | 17 | 48 |
| 7 days at 25° C. and 50% RH and 42 days at 250° C. | 30 | 55 | 65 | 13 | | 67 |
| % retained | 78 | 167 | 148 | 176 | — | 196 |
| lapshear strength - psi | | | | | | |
| 7 days at 25° C. and 50% RH | 205 | 105 | 304 | 115 | 105 | 230 |
| 7 days at 25° C. and 50% RH and 42 days at 250° C. | 165 | 300 | 533 | 215 | | 110 |
| % retained | 80 | 286 | 175 | 187 | — | 48 |

[1] Loctite 5920 Ultra Copper RTV silicone available from Henkel Corporation.
[2] Loctite 59675 Red High Temperature RTV silicone available from Henkel Corporation.
[3] Loctite 5612 high temperature RTV silicone available from Henkel Corporation.
— = not tested
[4] CAF 99 Black from Blue Star As shown in the following Table, cured reaction products of the disclosed compositions retain their mix of properties better than some other commercial products after exposure to temperatures of 300° C. for 3 days.

| Property | Example 1 | Example 2 | A[1] | B[2] | C[3] |
|---|---|---|---|---|---|
| tensile strength - psi | | | | | |
| 7 days at 25° C. and 50% RH | 270 | 385 | 200 | 220 | 305 |
| 7 days at 25° C. and 50% RH and 3 days at 300° C. | 235 | | 215 | | 680 |
| % retained | 87 | — | 108 | — | 223 |
| elongation - % | | | | | |
| 7 days at 25° C. and 50% RH | 200 | 285 | 350 | 450 | 135 |
| 7 days at 25° C. and 50% RH and 3 days at 300° C. | 240 | | 170 | | 10 |
| % Retained | 120 | — | 49 | — | 7 |
| hardness - Shore A | | | | | |
| 7 days at 25° C. and 50% RH | 27 | 33 | 17 | 17 | 48 |
| 7 days at 25° C. and 50% RH and 3 days at 300° C. | 21 | 167 | 30 | | 94 |
| % retained | 81 | 505 | 176 | — | 195 |
| lap shear strength - psi | | | | | |
| 7 days at 25° C. and 50% RH | 205 | 105 | 115 | 105 | 230 |
| 7 days at 25° C. and 50% RH and 3 days at 300° C. | 105 | | 60 | | 180 |
| % retained | 51 | — | 52 | — | 78 |

[1] Loctite 5920 Ultra Copper RTV silicone available from Henkel Corporation.
[2] Loctite 59675 Red High Temperature RTV silicone available from Henkel Corporation.
[3] Loctite 5612 high temperature RTV silicone available from Henkel Corporation.
— = not tested The proceeding description is meant to be exemplary and it is to be understood that variations and modifications may be employed without departing from the concept and intent of the invention as defined in the following claims.

What is claimed:

1. A two part curable composition, wherein:
    the first part comprises organosiloxane polymer, water, and optionally hexamethyldisilazane (HMDS);
    the second part comprises crosslinker; adhesion promoter, catalyst, and 0% to 12% hexamethyldisilazane (HMDS);
    either or both parts comprise a filler selected from Cristobalite, surface treated Cristobalite and combinations thereof; and
    either or both parts can optionally further comprise one or more of vinyltrimethoxysilane; plasticizer; colorant, filler other than Cristobalite and additives;
    wherein all of the filler in the composition has a d50 size of about 1 to about 30 microns, at least one of the parts contains at least 0.1 wt. % of hexamethyldisilazane (HMDS) and the mixed composition has a viscosity less than 600,000 cP at 25° C. and an extrusion rate greater than 100 grams/minute measured at 6 bar through a Quadro MFQX 10.7-24 static mixer.

2. The two part curable composition of claim 1 wherein the organosiloxane polymer is hydroxy terminated polydimethyl siloxane.

3. The two part curable composition of claim 1 wherein the first part further comprises silica filler and the water is bound to the silica filler.

4. The two part curable composition of claim 1 wherein both the first part and the second part comprise Cristobalite filler.

5. The two part curable composition of claim 1 wherein the second part further comprises polydimethyl siloxane plasticizer.

6. The two part curable composition of claim 1 wherein the crosslinker is an oxime compound.

7. The two part curable composition of claim 1 wherein the crosslinker is an acetoxy compound and the adhesion promoter is an epoxy compound.

8. The two part curable composition of claim 1 wherein the second part further comprises filler selected from Cristobalite, carbon black, quartz, silica, copper powder, iron oxide and combinations thereof.

9. Cured reaction products of the two part curable composition of claim 1.

10. Cured reaction products of the two part curable composition of claim 1 wherein the cured products retain 70% to 120% of their cured tensile strength and elongation and hardness and lap shear strength properties after exposure to temperatures of 250 ° C. for up to 42 days.

11. Cured reaction products of the two part curable composition of claim 1 wherein the cured products retain 80% to 110% of their cured tensile strength and elongation and hardness and lap shear strength properties after exposure to temperatures of 250 ° C. for up to 42 days.

12. Cured reaction products of the two part curable composition of claim 1 wherein the cured products retain 50% to 130% of their cured tensile strength and elongation and hardness and lap shear strength properties after exposure to temperatures of 300 ° C. for periods of up to 3 days.

13. A gasket disposed between two sealing surfaces comprising cured reaction products of the two part curable composition of claim 1.

14. An appliance or automotive component comprising the two part curable composition of claim 1 disposed between two sealing surfaces.

* * * * *